US009036730B2

(12) United States Patent
Flamant et al.

(10) Patent No.: US 9,036,730 B2
(45) Date of Patent: May 19, 2015

(54) METHOD AND APPARATUS FOR PEAK-TO-AVERAGE RATIO REDUCTION

(75) Inventors: Sylvain Flamant, Saratoga, CA (US); Qasem Aldrubi, Fremont, CA (US); Echere Iroaga, Mountain View, CA (US); Jason Hu, Palo Alto, CA (US)

(73) Assignee: IKANOS COMMUNICATIONS, INC., Fremont, CA (US)

( * ) Notice: Subject to any disclaimer, the term of this patent is extended or adjusted under 35 U.S.C. 154(b) by 507 days.

(21) Appl. No.: 13/346,638

(22) Filed: Jan. 9, 2012

(65) Prior Publication Data

US 2012/0177148 A1    Jul. 12, 2012

Related U.S. Application Data

(60) Provisional application No. 61/430,863, filed on Jan. 7, 2011.

(51) Int. Cl.
*H04B 15/00* (2006.01)
*H04L 27/26* (2006.01)

(52) U.S. Cl.
CPC ......... *H04L 27/2624* (2013.01); *H04L 27/2647* (2013.01)

(58) Field of Classification Search
USPC .......................................................... 375/285
See application file for complete search history.

(56) References Cited

U.S. PATENT DOCUMENTS

| 4,394,742 | A | * | 7/1983 | Crummer et al. | 701/102 |
| 5,422,643 | A | * | 6/1995 | Chu et al. | 341/141 |
| 6,314,146 | B1 | | 11/2001 | Tellado et al. | |
| 6,424,681 | B1 | | 7/2002 | Tellado et al. | |
| 6,842,492 | B1 | | 1/2005 | Eibling et al. | |
| 8,335,484 | B1 | * | 12/2012 | Arad et al. | 455/343.2 |
| 2008/0247487 | A1 | | 10/2008 | Cai et al. | |
| 2009/0310704 | A1 | | 12/2009 | Jethanandani et al. | |
| 2010/0033360 | A1 | | 2/2010 | Liao et al. | |

OTHER PUBLICATIONS

International Search Report and Written Opinion issued May 3, 2012 for PCT/US2012/020602.

* cited by examiner

*Primary Examiner* — Lihong Yu
(74) *Attorney, Agent, or Firm* — Pillsbury Winthrop Shaw Pittman LLP (57) ABSTRACT

Peak-to-average ratio reduction is achieved by detecting peaks in an original analog signal that exceed a given threshold. Segments of the original analog signal containing such peaks are treated (e.g., by attenuation) and a composite analog signal is assembled that includes treated and untreated segments of the original analog signal. The composite analog signal is processed to perform analog-to-digital conversion to generate a composite digital signal. Segments of the composite digital signal corresponding to the treated segments of the original analog signal are reverse-treated or otherwise treated again to undo treatment of the segments of the original analog signal. A final output digital signal is generated that corresponds to the original analog signal in digital form.

11 Claims, 8 Drawing Sheets

METHOD AND APPARATUS FOR PEAK-TO-AVERAGE RATIO REDUCTION

CROSS-REFERENCE TO RELATED APPLICATIONS

The present application claims priority to U.S. Provisional Application No. 61/430,863 filed Jan. 7, 2011, the contents of which are incorporated herein by reference in their entirety.

FIELD OF THE INVENTION

Apparatus, systems, methods, techniques, etc. are disclosed for reducing the peak-to-average ratio of a received DSL signal and, in some embodiments, improving digital reconstruction of the analog signal.

BACKGROUND OF THE INVENTION

Some forms of multi-carrier transmission are composed of a number of independent signals centered on different frequencies. In some multi-carrier communication systems signals are combined together as a vector. An inverse fast Fourier transform (IFFT) can be performed on the vector to produce a discrete time domain signal which is converted to a continuous time domain signal and transmitted. Such a transmitted analog signal can contain a number of peaks, some of which can exceed component and/or other capabilities of the system.

In a DSL environment the level distribution on the line is quasi Gaussian. This means that the peak-to-average ratio (PAR) (where the peak is defined as the level above which the probability to reach such level is $10^{-7}$) is 5.2. This presents significant challenges to the design of the analog components (e.g., drivers, data converters, etc.) that are required to accommodate or supply high signal levels that occur only a fraction of the time. Attempts have been made to find methods to reduce the PAR in the transmit path (see, for example, U.S. Pat. No. 6,314,146 and U.S. Pat. No. 6,424,681, which are incorporated herein by reference for all purposes), but comparable efforts do not appear to have not been expended on PAR reduction in the receive path.

SUMMARY OF THE INVENTION

The present invention generally relate to apparatuses, systems, methods, techniques, etc. for reducing a peak-to-average ratio of a received DSL signal. According to certain aspects, this is accomplished using attenuation and multiplexing of the analog signal in the analog path, yielding a corresponding increase of peaks in a converted/corresponding digital signal to provide improved reconstruction of the analog signal. Improvement can include effectively increasing the effective number of bits (ENOB) of an analog-to-digital converter (ADC) by at least 1 bit. In some embodiments, detected "peaks" of the time domain DSL signal are reduced by a known exact factor, for example at the input of an ADC, to produce a reduction in the PAR of the DSL signal with as little change as possible to the average value of the signal (RMS). After the ADC converts the analog signal into a digital signal, the process is inversed by scaling the previously reduced samples (samples corresponding to the peaks) so that the signal is reconstructed. This processing thus presents a better conditioned signal to the ADC, and reduces the detrimental effect of thermal and quantization noise introduced by the converter.

In accordance with these and other aspects, a method for reducing the peak-to-average ratio (PAR) of an analog signal in a xDSL system according to embodiments of the invention includes detecting one or more peaks exceeding a threshold value in an original analog signal; constructing a composite analog signal comprising untreated segments of the original analog signal that do not exceed the threshold value and treated segments of the original analog signal that include one or more peaks that exceed the threshold; converting the composite analog signal to a composite digital signal; and constructing an output digital signal corresponding to the original analog signal by reverse-treating segments of the composite digital signal corresponding to the treated segments of the original analog signal.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

In general, this detailed description, taken in conjunction with the accompanying drawings, describes apparatuses, systems, methods, techniques, etc. for reducing a peak-to-average ratio of a received DSL signal in order to improve the digital signal obtained after analog-to-digital conversion in a DSL system or the like. This is accomplished in some embodiments using attenuation and multiplexing of the analog signal in the analog path, yielding a corresponding increase of peaks in a converted/corresponding digital signal to provide improved reconstruction of the analog signal. Improvement can include effectively increasing the effective number of bits (ENOB) of an analog-to-digital converter (ADC) by at least 1 bit.

The present inventors recognize that a more optimized receive path can be achieved by finding a way to reduce the PAR at the ADC converter input and in a simple fashion. For example, reducing the PAR by a ratio of 2 is equivalent to adding an extra bit in the ADC converter. With the high resolution requirements typically seen in DSL systems, one extra bit of accuracy can easily translate into a doubling or quadrupling of ADC power, design complexity and time, thus making PAR reduction a much cheaper solution than designing a converter with a true extra effective bit. Such a system would satisfy this requirement.

The present inventors further recognize that Digital Subscriber Line (DSL) systems require quasi-perfect linearity, meaning that the signal needs to be reconstructed perfectly further down the digital path, with minimum distortion. Various apparatuses, methods, etc, described herein thus provide a PAR reduction of 6 dB or more, in front of the ADC converter in analog, and then allow improved reconstruction of the signal in digital after the ADC conversion. PAR reduction as described and/or taught herein can be applied to and used in a wide variety of DSL components, devices and products such as a Very-high-bit-rate DSL (VDSL) modem at the customer premises, or a VDSL modem at the central office which can combine this invention with the multiplexing of multiple ports and using one single converter. Moreover, the term "DSL signal" as used herein can apply to signals in any standard or proprietary DSL format including Asymmetric DSL (ADSL) and VDSL systems, hereafter referred to as xDSL systems.

In some embodiments of the invention, detected "peaks" (or segments including such peaks) of a time domain DSL signal or the like are reduced (for example, by attenuation) by an exactly known factor, for example at the input of an ADC, to produce a reduction in the PAR of the DSL signal with as little change as possible to the signal's average value (RMS). This yields a composite analog signal. After the ADC converts the composite analog signal into a composite digital signal, the previously-applied attenuation processing is inversed by scaling previously reduced samples (samples corresponding to the peaks) so that the signal is reconstructed. This processing thus presents a better conditioned signal to the ADC, and reduces the detrimental effect of thermal and quantization noise introduced by the analog-to-digital converter.

Figure 1:
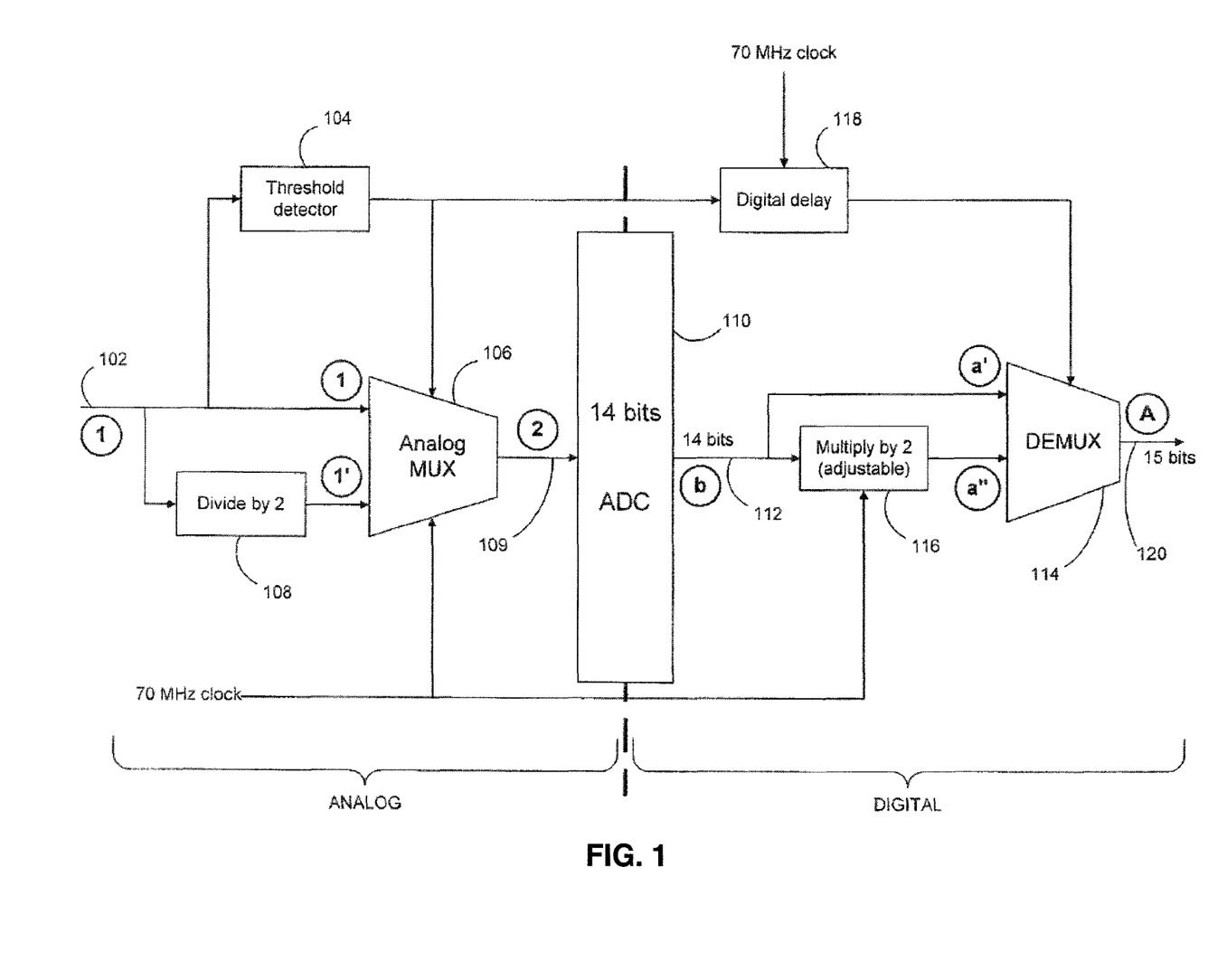
FIG. 1 is a block diagram of peak-to-average ratio reduction according to one or more peak-to-average ratio reduction embodiments and/or implementations.

FIG. 1 illustrates an exemplary PAR reduction apparatus 100 for a xDSL system in accordance with certain aspects of the invention. Apparatus 100 can be included in an analog front end (AFE) of a DSL modem and/or modem chipset, for example. Those skilled in the art will understand how to adapt conventional functionality and circuitry in these and other chipsets and devices so as to implement the invention after being taught by the following examples.

In this example embodiment, an ADC 110 uses a 6 dB PAR reduction at the converter input. More particularly, as shown in FIG. 1, the original analog signal (referred to herein as "circle-1" and shown as the circle with the number 1 inside in FIG. 1) arrives on line 102 and is provided to a divide-by-two attenuator 108 which produces a 6 dB attenuated analog signal circle 1'. At the same time, the original signal circle-1 is evaluated by threshold detector 104 for threshold-exceeding peaks. If such a peak is detected by detector 104, then it sends a corresponding signal to multiplexer 106 that causes it to select the attenuated analog signal circle-1' (also referred to herein as the "treated analog signal") from attenuator 108. Otherwise, the "untreated" original analog signal circle-1 is selected. By selectively switching between inputs of the untreated original analog signal circle-1 and the treated (e.g., attenuated) analog signal circle-1' from divider 108, a composite analog signal (referred to herein as "circle-2" and in FIG. 1) is outputted from the multiplexer 106 to the input of ADC 110, which performs analog-to-digital conversion of the composite analog signal circle-2 at input 109. The composite digital signal circle-b at output 112 of ADC 110 is available directly to one input of demultiplexer 114 as digital signal circle-a'. The composite digital signal at output 112 also is rescaled by multiplier 116 to restore signal segments, peaks, etc. that were attenuated by divider 108, and thus generate digital signal circle-a'. The output of threshold detector 104 is also sent to demultiplexer 114 (in some embodiments using a digital delay 118), to permit properly timed reconstruction of the original analog signal's digital counterpart from the composite digital signal by switching the demultiplexer inputs appropriately to generate the constructed digital signal circle-a at output 120 of demultiplexer 114.

More particularly, in the example of FIG. 1, the ADC 110 is clocked at a 70 MHz rate (which is above the Nyquist rate of a VDSL signal with a maximum carrier frequency of 30 MHz). Accordingly, the multiplexer 106 and demultiplexer 114 are similarly clocked with the same clock signal. Those skilled in the art will appreciate that some digital delay such as that incorporated into 118 may be needed to account for the signal propagation delays between multiplexer 106 and demultiplexer 114, but even further details thereof will be omitted here for sake of clarity of the invention.

Figure 2A:
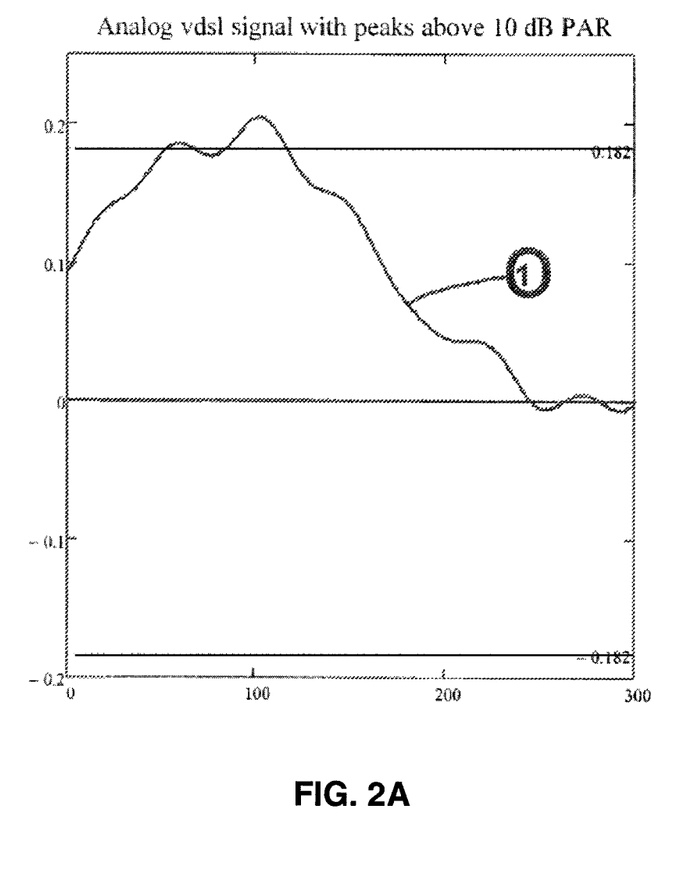
FIGS. 2A-2F are exemplary signal plots relative to the block diagram of FIG. 1 and/or one or more other peak-to-average ratio reduction embodiments and/or implementations.
Figure 2B:
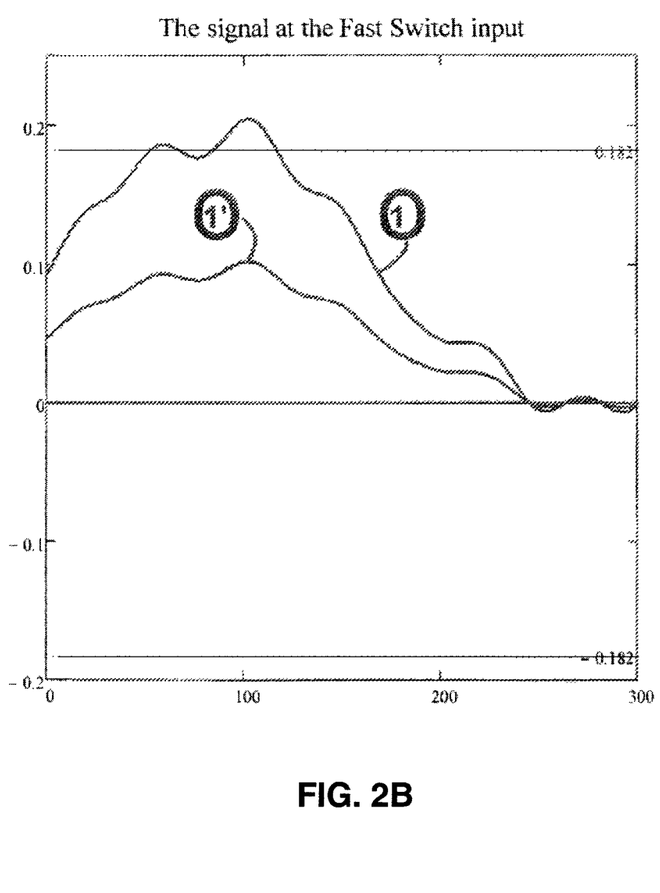
Figure 2C:
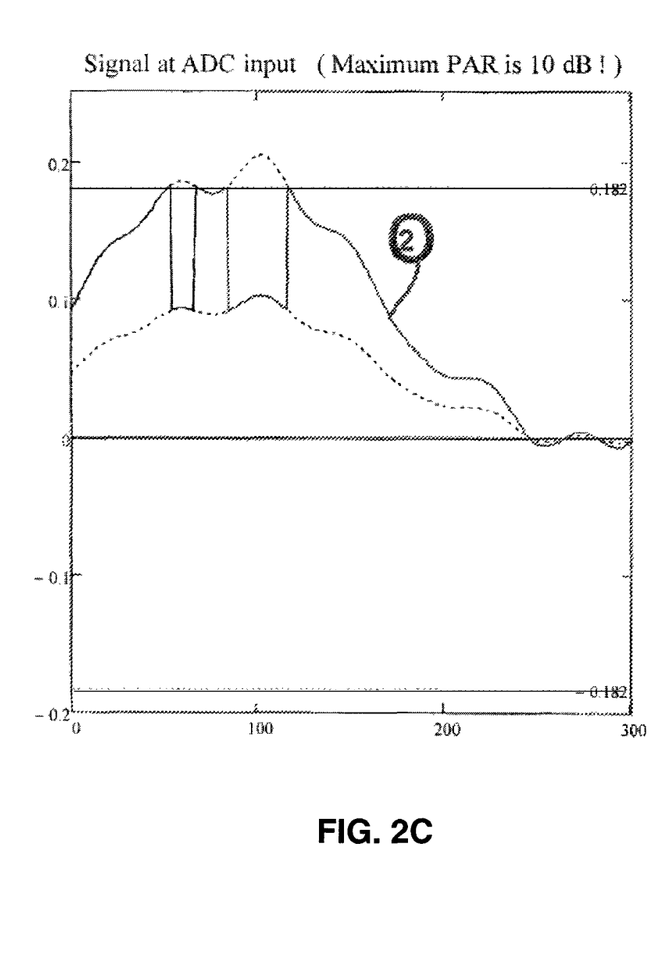
Figure 2D:
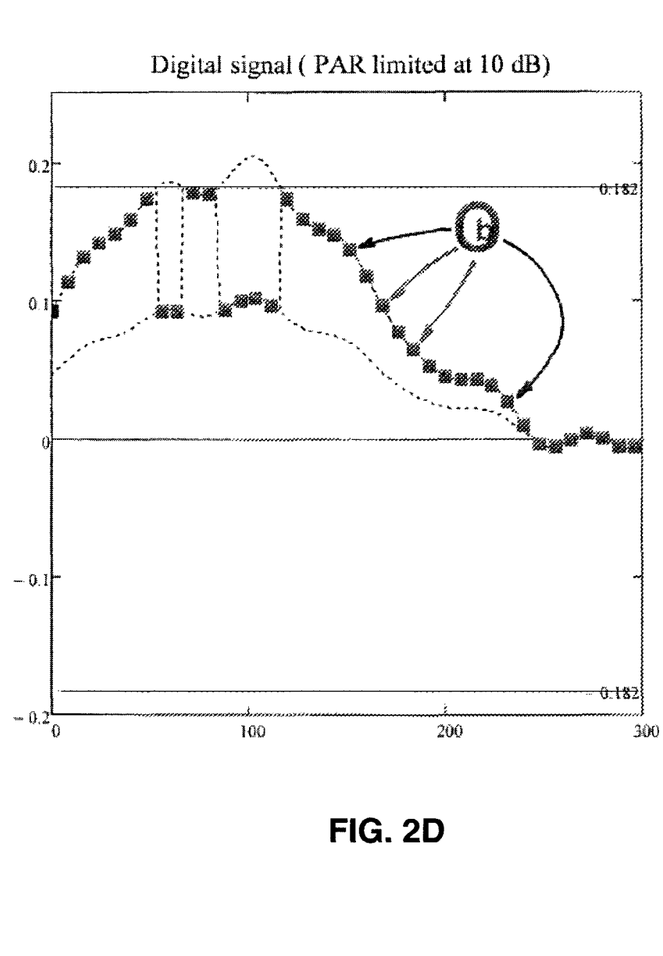
Figure 2E:
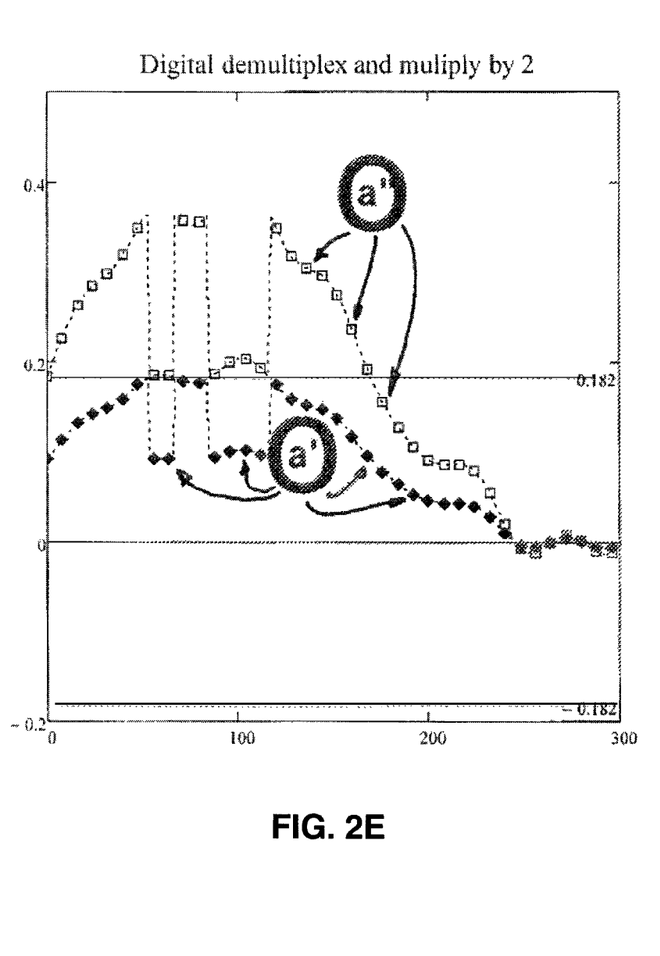
Figure 2F:
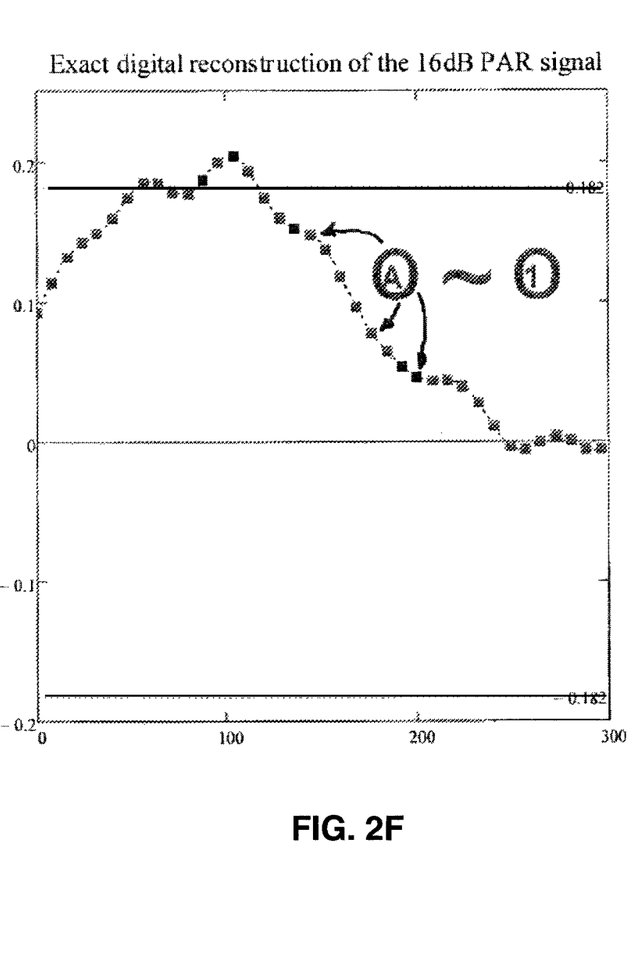

FIGS. 2A-2F show signals referenced in FIG. 1 for an exemplary received VDSL signal having one or more peaks above a designated threshold. In the illustrated exemplary signals, the threshold is 0.182. This example threshold value was obtained from an actual VDSL signal simulation where the peak-to-peak level (@ 16 dB) was 0.364. So the example used an attenuation factor of 2, and as a consequence the 16 dB−6 dB threshold was 0.182 (i.e. 10 dB). FIG. 2A illustrates an exemplary original analog signal circle-1 received on a VDSL line. At FIG. 2B the original analog signal circle-1 and the output circle-1' of divider 108 are shown—these are the two inputs to multiplexer 106 in the exemplary ADC of FIG. 1. FIG. 2C shows the input circle-2 of ADC 110, wherein the composite analog signal has been assembled and/or otherwise reconfigured using both original analog signal segments as well as attenuated analog signal segments. FIG. 2D shows the output circle-b of ADC 110, where the input circle-2 has been digitized. This ADC digital output signal circle-b is sent to one input of demultiplexer 114 directly as input signal circle-a' and also via multiplier 116 as signal circle-a" to provide the data shown in FIG. 2E. Finally the digital signal corresponding to original analog signal circle-1 is reconstructed as a digital signal circle-A in FIG. 2F, which is the output 120 of demultiplexer 114.

In embodiments such as those illustrated in connection with FIG. 1, peaks (or analog signal segments containing such peaks) in the analog signal can be conditioned and reduced by multiplexing two signals at an ADC converter input, for example by using an analog multiplexer controlled by the output of a threshold detector (such as a comparator or the like, which compares the absolute value of the signal to a fixed threshold). For analog signals having peaks below the threshold, the multiplexer selects the original incoming analog signal. For analog signals having peaks above the threshold, the multiplexer selects an attenuated version for a segment of the original analog signal. The attenuation factor in some embodiments can be equal to the ratio between the maximum level the ADC can accept without distortion and the threshold level used by the threshold detector (e.g., comparator). The input to the ADC thus becomes a composite analog signal potentially comprising segments of both the original analog signal as well as segments of the attenuated analog signal. In the digital domain, the ADC output samples correspond to the composite analog signal—samples corresponding to attenuated analog signal segments from the multiplexer path, are "rescaled" or "restored" by a digital gain factor equal to the inverse of the attenuation factor previously applied. In some embodiments, multiplexer switching has to be faster than the time between two successive tics of the ADC sampling clock, each time that the comparator output changes state. The digital signal that is thus constructed from converted original analog signal segments and attenuated analog signal segments fed to the ADC corresponds to the original analog signal, but with improved reconstruction due to the avoidance of excessive peaks in the original analog signal.

As mentioned above, the switching state of the multiplexer can be provided with appropriate delays and timing synchronization with the ADC digital output so that the correct ADC output samples undergo digital rescaling and so the data can be properly reconstructed in the digital domain. To avoid distortion resulting from mismatch of gains between the analog attenuation and the digital gain rescaling, self-calibration of the digital gain can be used in some cases.

Using PAR reduction as described and/or taught herein, an ADC's performance is significantly better without incurring the high costs and/or problems associated with redesigning an increasingly costly ADC (e.g., an effective 11 bit converter can appear as an effective 12+ bit converter), which means that in cases where the receiver noise is dominant on some DSL frequency bands, up to an extra bit can be loaded on the tones within these bands. That translates directly into improved rate that the xDSL system is able to sustain for the same error rate.

It should be noted that the example of FIG. 1 is not limiting, and that some implementations may include fewer or additional numbers of blocks. For example, in some implementations all that is needed on the analog side is a level divider, a fast comparator and a fast analog multiplexer. The ADC may need to be able to accept an analog signal with higher frequency content at its input. On the digital side, some implementations may only need an extra (in some cases adjustable) delay block and one multiplier, which are neither difficult nor costly to implement. This type of configuration also can be combined advantageously with a multiplexing scheme in which multiple ports use a single converter as both designs share some timing and frequency constraints.

Generally, a gain of a little more than 1 ENOB can be realized by using a ratio in the range of approximately 2 to approximately 4, with an ENOB gain between 1.1 and 1.2 likely, once level margins are taken into account for the analog threshold decision. It is preferable for the analog signal attenuation factor and digital signal rescaling factor match as close as possible to avoid distortion resulting from mismatch of gains. The success in this matching will determine how close to 4 the analog divider ratio can be to take advantage of a better ENOB gain.

The maximum theoretical ENOB that can be attained for a given attenuation factor can be calculated exactly using the following pseudocode, for example.

$$\text{ENOB\_gain} := \begin{vmatrix} \text{for } n \in \ldots 150 \\ \quad K_n \leftarrow 1 + \frac{n}{10} \\ \quad \text{Stdev\_new}_n \leftarrow \sqrt{\left(\int_{-5.2}^{5.2} \text{dnorm\_K}(x, K_n) \cdot x^2 \, dx\right)} \\ \quad \text{ENOB}_n \leftarrow \frac{20\log(\text{Stdev\_new}_n)}{20\log(2)} \\ \text{ENOB} \end{vmatrix}$$

$$n := 0 \ldots 150$$

$$\text{Divider\_ratio}_n := 1 + \frac{n}{10}$$

Where dnorm_K(x,K) is defined as 1/K×dnorm(x/K, 0, 1)+if (|x|>5.2/K, dnorm(x, 0, 1), 0)

This probability density corresponds to the level distribution of our circuit output when the attenuation factor is set at K, and for which, those skilled in the art could easily verify that the integral of dnorm_K(x,K) for x in the range of −5.2 to 5.2 equals 1 for all values of K, such that 1<K<10.

Figure 3A:
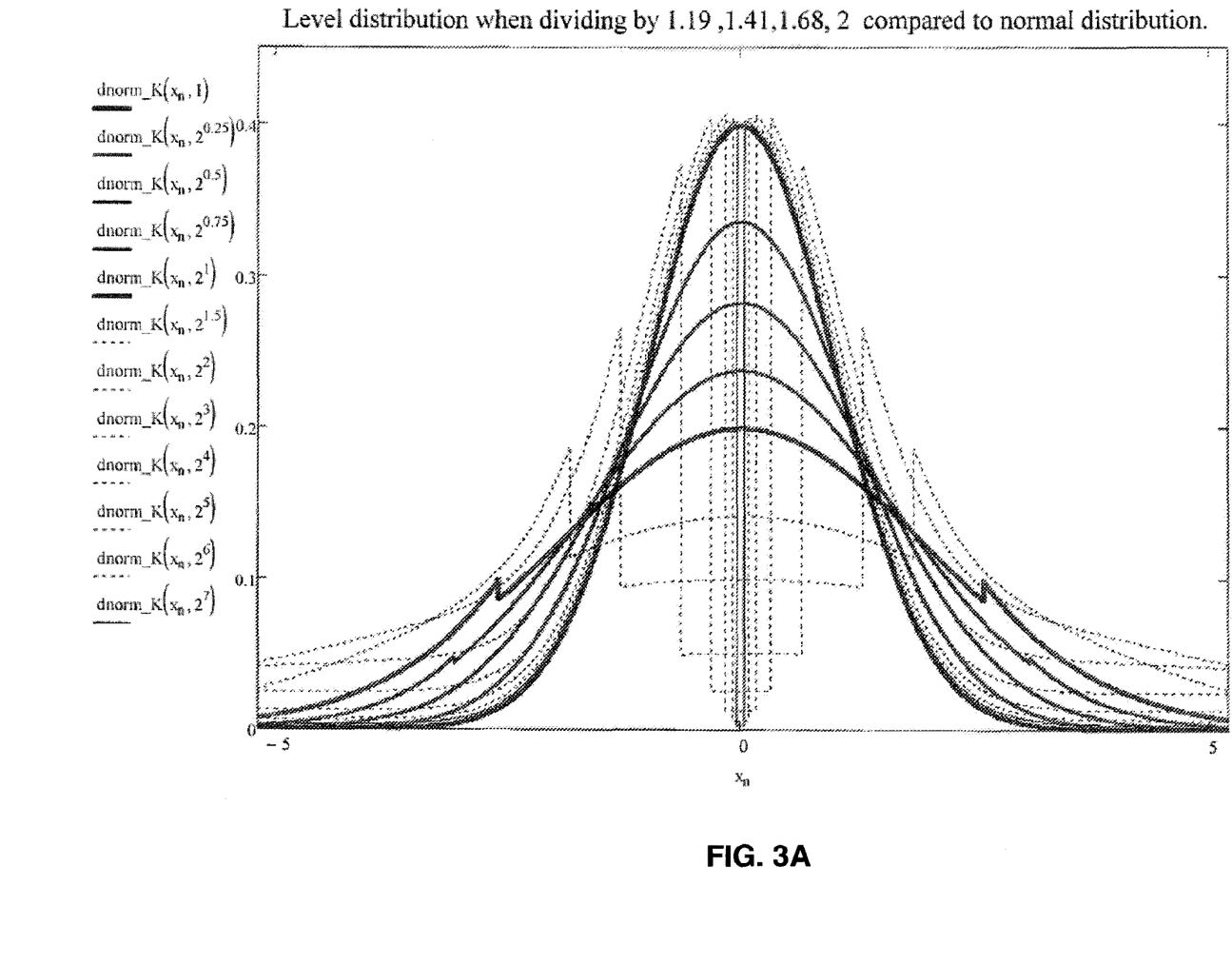
FIGS. 3A and 3B illustrate level distributions compared to normal distribution.
Figure 3B:
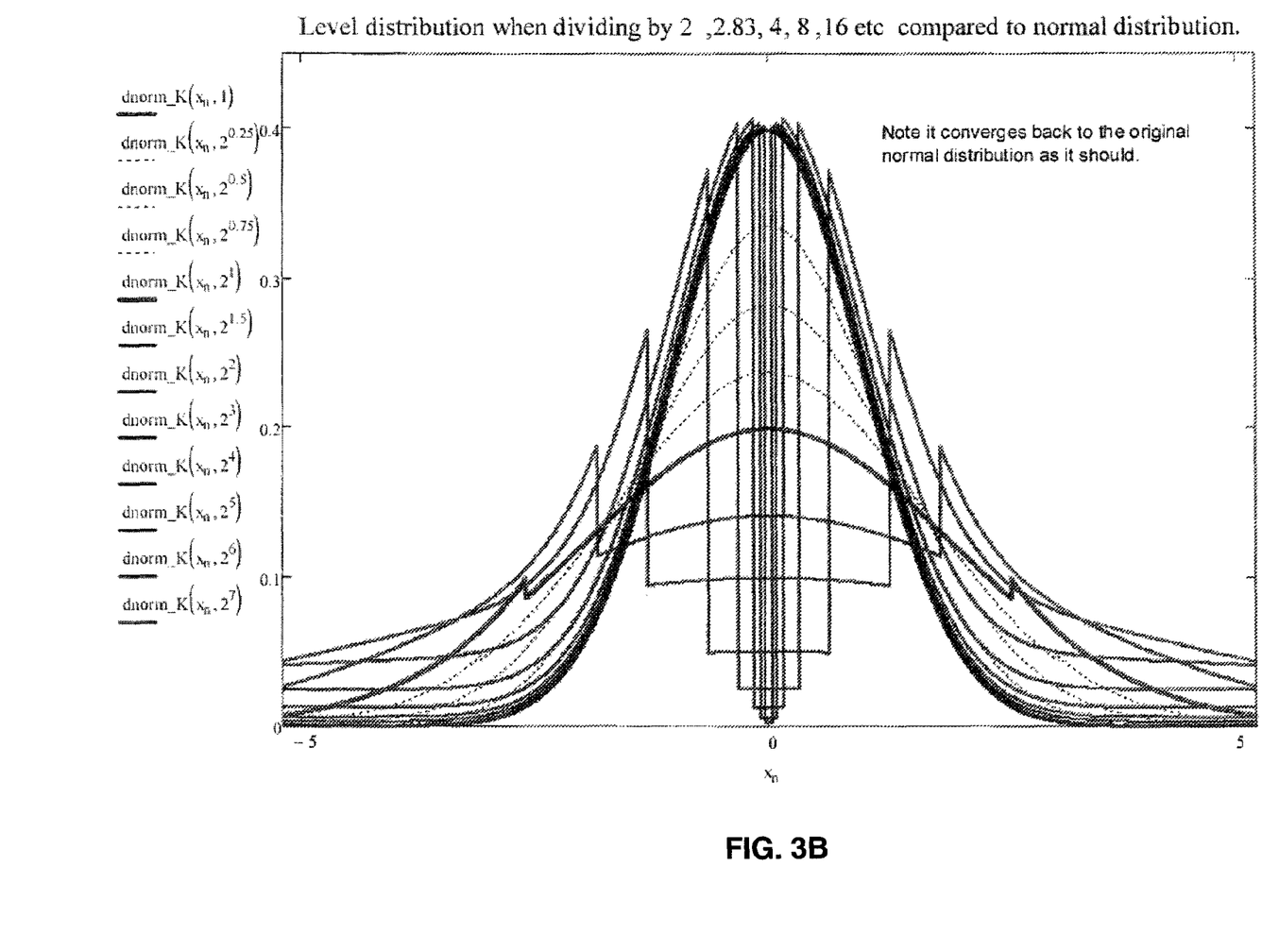

The value can also be seen visually in FIGS. 3A and 3B, where it corresponds to the ratio of the new standard deviation to the original standard deviation without the benefit of this invention. For example, on FIGS. 3A and 3B it can be seen that as the attenuation ratio increases from 1.19 to 2+ the distribution "pulse" widens and then returns to the original shape when the attenuation increases from 2+ to infinity. At its maximum width, the distribution becomes wider by a little more than a factor of 2, thus an ENOB gain of a little more of 1 (the ENOB is the $\log_2$ of the ratio of the 2 standard deviations) As further shown in the table below, the percentage column is important, because the more time spent in the switching state increases the power consumption, and even more important the distortion that is inherent to the switching will be greater. One can never design a perfect analog system whose gain will be known perfectly and perfectly compensated in the digital domain. That will break the linearity of the system, and as a consequence one preferably should avoid choosing an attenuation ratio with a high percentage of time spent in the switching state. That is where the compromise comes from. It is generally desired to have both a higher ENOB gain but a lower percentage of time switching. The analog circuit will determine the amount of percentage time in the switching state that can be afforded.

|  | ENOB gain | percentage of time using lower power path |
|---|---|---|
| Divide by 2 | 0.96 | 1% |
| Divide by 3 | 1.28 | 8.3% |
| Divide by 4 | 1.34 | 20% |

It should be noted that it is difficult to achieve attenuation in analog components to a precise value. For example, if an attenuation factor of 2 were desired, resistors of 10 kOhm and 20 kOhm might be used, but the actual values of these resistors cannot be estimated with precision. So once the uncertainty of the resistor values is taken into account (varying from board to board), a factor of 2 is actually $2+\epsilon$ (where $\epsilon$ is a positive or negative fraction). So a multiplier having the same scaling factor of $2+\epsilon$ would be needed to compensate the attenuated signal exactly in digital. Practically speaking, the signal reconstruction can never be done perfectly, thereby causing at least some distortion, but this can be mitigated by good analog design and by not choosing an attenuation ratio that is too aggressively high.

Moreover, as shown above, the maximum estimated ENOB gain is 1.34 when dividing by 4. However, dividing by 4 is not optimum for switching between two paths. Moreover, it is likely that (from the analog point of view) a guard band on the threshold may be added to give the threshold detector time to react, not counting the power consumption of the multiplexer that will go up quickly with a higher divider due to increased switching frequency between two analog paths (at least in a one port solution—in a two post multiplexing solution, it is necessary to switch between the two ports at each tick of a clock, e.g., a 70 MHz clock). Those skilled in the art will understand how to implement such practical design details based on the descriptions herein.

FIGS. 3A and 3B are histograms of level distributions. As explained in more detail above, these figures show how the distribution widens as the attenuation varies from 1 to infinite. The wider distribution corresponds to a more desirable ENOB.

Figure 4:
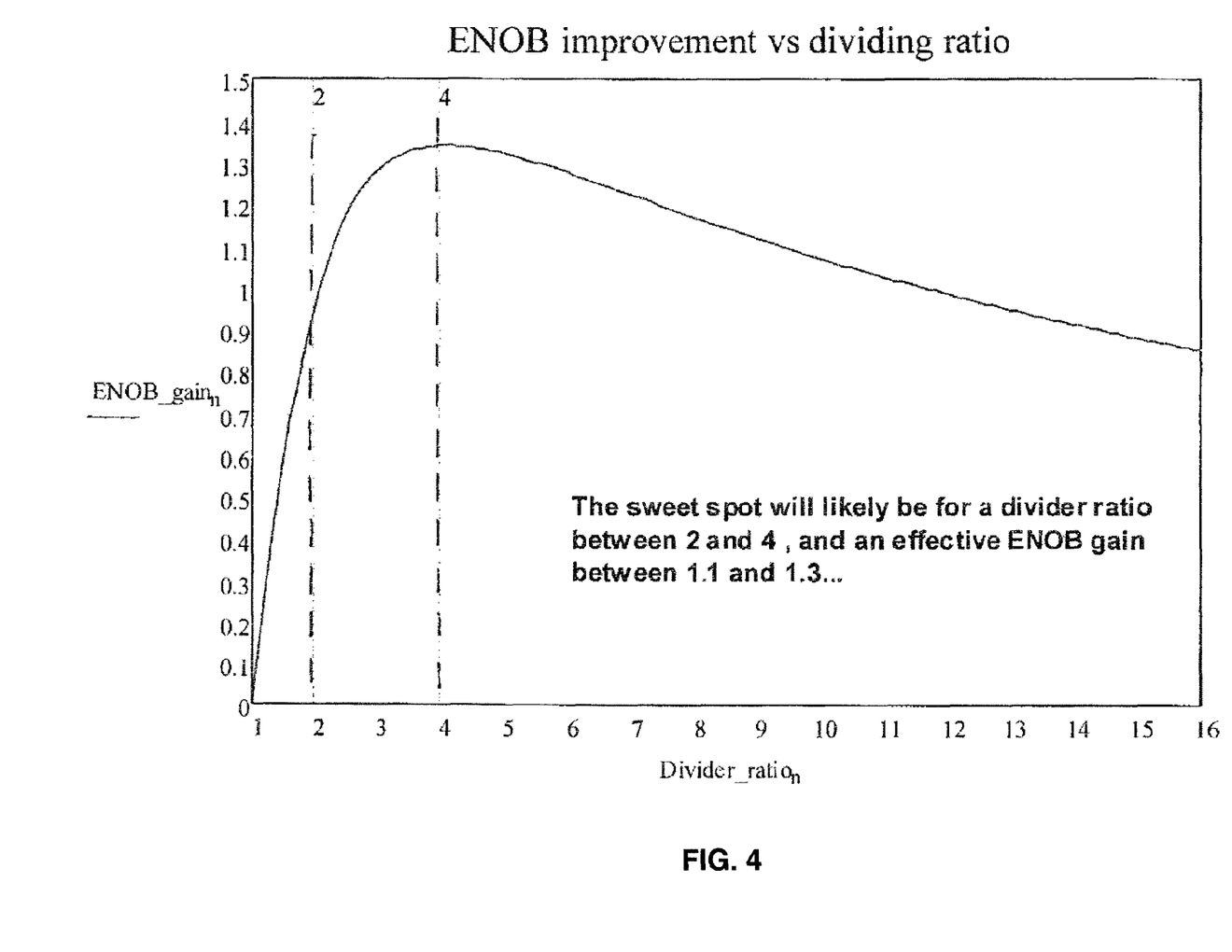
FIG. 4 illustrates computations illustrating the ENOB_gain equivalent for different peak reduction factors.

FIG. 4 illustrates the ENOB-gain equivalent for different peak reduction factors (i.e., divider ratios given by the variable K). An attenuation factor of and reduction by $K=2$ (i.e., 6 dB) can yield an effective gain of 0.95 ENOB. A reduction by $K=4$ can yield an effective gain of 1.34 ENOB. After considering available compromises, the final effective ENOB gain can be a little more than 1 bit (but less than 1.34). When dividing by a number higher than $K=2$, the ENOB increases up to a "sweet-spot" where the distribution across the full range of the ADC looks more like a uniform distribution, making better use of the full dynamic range of the ADC (assuming that the ADC is not worse at higher levels than at the lower levels, which might not always be true). Shown are potential ENOB gains as a function of the dividing ratio K. The new level distribution is derived as the attenuation/rescaling (K) ratio varies first from 1 to 2, and then from 2 to infinite (it converges back to the original Gaussian distribution). Once the new distribution as a function of K is obtained, the new standard deviation as a function of K can be determined. Because the quantization noise (or the thermal noise) does not change, the ENOB and the ENOB_gain are solely dependent on the ratio of the new standard deviation to the standard deviation of the original Gaussian distribution. How the ENOB_gain varies as a function of K is shown. ENOB_gain increases from 0 to a maximum of 1.34 as K reaches 4, and then returns to 0 as K goes to infinity.

Figure 5:
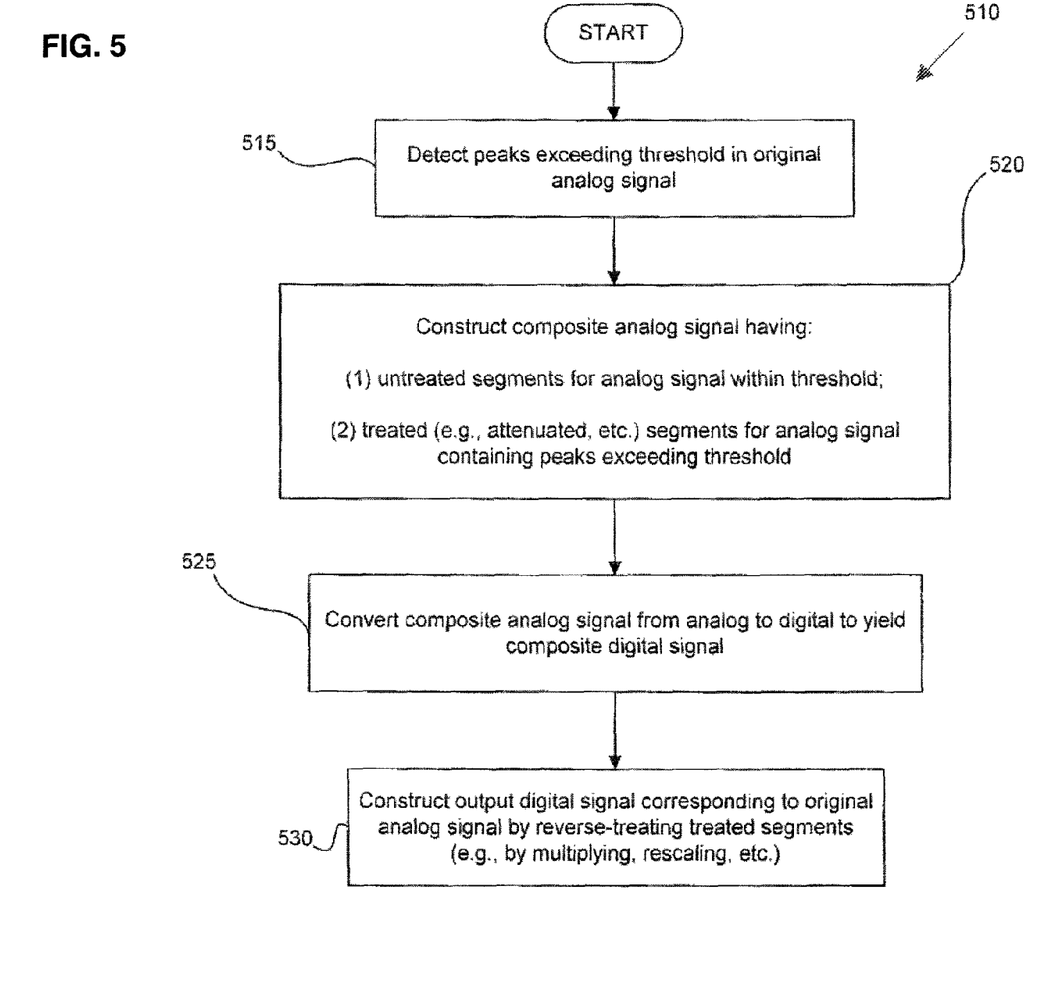
FIG. 5 is a flow diagram illustrating peak-to-average ratio reduction according to one or more peak-to-average ratio reduction embodiments and/or implementations.

One or more example methods, processes, etc. for reducing the PAR of a DSL signal or the like according to aspects of the invention are shown in FIG. 5. It should be noted that this method can be largely implemented in hardware, particularly the analog and A/D conversion portions, and those skilled in the art will understand how to implement this functionality in hardware after being taught by the present examples. It should be further noted that software/firmware may further be included to control or dynamically adapt the hardware for various conditions. For example, one could employ a self calibration scheme, by which test signals would be fed to the input to be measured by the digital circuit, such that the actual attenuation coefficient of the hardware for the given board could be measured accurately, and a piece of software or hardware in the digital path could be easily thought of as to compensate exactly for the measured attenuation factor. The invention also includes systems in which the "Divide by 2" block could offer a plurality of discrete attenuation factors to choose from, as a function of the signal characteristics that would need to be processed, rather than just a single attenuation factor. Those skilled in the art will appreciate the details of these and other implementations after being taught by the present examples.

As shown in FIG. 5, process 510 includes step 515 where peaks (or segments including peaks) having a signal value over a given threshold in the original signal are detected. In step 520, a composite analog signal is formed, having untreated segments corresponding to times when the original signal is below the threshold, and treated segments corresponding to times when the original signal is above the threshold. In step 525 the composite analog signal is converted to a composite digital signal. Lastly in step 530 an output digital signal is created to correspond to the original analog signal by reverse-treating the segments in the composite digital signal corresponding to the treated portions of the composite analog signal.

The many features and advantages of the present disclosure's subject matter are apparent from the written description, and thus, the appended claims are intended to cover all such features and advantages. Further, since numerous modifications and changes will readily occur to those skilled in the art, PAR is not limited to the exact construction and operation as illustrated and described. Therefore, the described embodiments should be taken as illustrative and not restrictive, and PAR reduction hereunder should not be limited to the details given herein but should be defined, inter alia, by the following claims and their full scope of equivalents, whether foreseeable or unforeseeable now or in the future.

Moreover, although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A method for reducing the peak-to-average ratio of an analog signal in a Digital Subscriber Line (DSL) system, the method comprising:
    detecting one or more peaks exceeding a threshold value in an original analog signal;
    constructing a composite analog signal comprising untreated segments of the original analog signal that do not exceed the threshold value and treated segments of the original analog signal that include one or more peaks that exceed the threshold;
    converting the composite analog signal to a composite digital signal;
    constructing an output digital signal corresponding to the original analog signal by reverse-treating segments of the composite digital signal corresponding to the treated segments of the original analog signal,
    wherein the treated segments of the analog signal comprise segments wherein the analog signal has been attenuated and/or processed by a signal divider, and wherein the reverse-treated segments of the composite digital signal comprise segments wherein the composite digital signal have been re-scaled and/or processed by a signal multiplier.

2. The method of claim 1, wherein the composite analog signal is assembled by multiplexing treated and untreated segments of the original analog signal.

3. The method of claim 1, wherein the output digital signal is constructed by demultiplexing untreated and reverse-treated segments of the composite digital signal.

4. The method of claim 1, wherein the composite analog signal is the same as the original analog signal during time segments where the original analog signal does not exceed the threshold value, and is a treated version of the original analog signal during time segments where the original analog signal does exceed the threshold value.

5. An apparatus for performing peak-to-average ratio reduction comprising:
   a threshold detector coupled to an original analog signal input line and configured to detect analog signal peaks exceeding a threshold;
   a divider configured to divide an original analog signal on the input line by an attenuation factor to generate an attenuated analog signal;
   a multiplexer coupled to the input line, the threshold detector and the divider, wherein the multiplexer is configured to receive as inputs (a) the original analog signal and (b) the attenuated analog signal, wherein the multiplexer is configured to assemble segments of the original analog signal and the attenuated analog signal to generate a composite analog signal;
   an analog-to-digital converter (ADC) coupled to the multiplexer and configured to convert the composite analog signal at an ADC input to a composite digital signal at an ADC output;
   a multiplier coupled to the ADC output and configured to multiply the composite digital signal by a resealing factor corresponding to the attenuation factor; and
   a demultiplexer coupled to the ADC output and to the multiplier and controlled by the threshold detector, the demultiplexer configured to construct an output digital signal corresponding to the original analog signal by multiplexing signals from the multiplier and from the ADC output.

6. The apparatus of claim 5 further comprising a delay device coupled between the threshold detector and the demultiplexer to provide timing coordination between the multiplexer and the demultiplexer.

7. A method comprising:
   receiving a Digital Subscriber Line (DSL) signal in an analog domain;
   identifying peak segments in the received DSL signal;
   producing a composite analog DSL signal that is the same as the received DSL signal except that the peak segments are replaced by treated segments;
   converting the composite analog DSL signal to a composite digital DSL signal; and
   producing an output digital DSL signal that is the same as the composite DSL signal except that portions of the composite DSL signal corresponding to the treated segments are reverse-treated to obtain digital values corresponding to the peak segments,
   wherein producing the composite analog DSL signal includes attenuating the received DSL signal by a predetermined factor, and
   wherein producing the output digital DSL signal includes multiplying the composite DSL digital signal by a rescaling factor corresponding to the predetermined factor.

8. The method of claim 7, wherein producing the composite analog DSL signal further includes:
   multiplexing the received DSL signal and the attenuated signal in correspondence with the step of identifying the peak segments.

9. The method of claim 7, wherein the steps of producing the composite analog DSL signal, converting the composite analog DSL signal and producing the output digital DSL signal are performed based on a common clock signal.

10. The method of claim 9, further comprising:
    introducing a delay between the steps of producing the composite analog DSL signal and producing the output digital DSL signal relative to the common clock signal.

11. The method of claim 8, further comprising:
    determining the predetermined factor in accordance with a desired effective number of bits (ENOB) gain in the converting step.

\* \* \* \* \*

UNITED STATES PATENT AND TRADEMARK OFFICE
CERTIFICATE OF CORRECTION

PATENT NO.        : 9,036,730 B2                              Page 1 of 1
APPLICATION NO.   : 13/346638
DATED             : May 19, 2015
INVENTOR(S)       : Flamant et al.

It is certified that error appears in the above-identified patent and that said Letters Patent is hereby corrected as shown below:

In the Specification

In Column 4, Line 26, delete "resealed" and insert -- rescaled --, therefor.

In Column 5, Line 24, delete ""resealed"" and insert -- "rescaled" --, therefor.

In Column 6, Line 4, delete "resealing" and insert -- rescaling --, therefor.

In the Claims

In Column 9, Line 36, in Claim 5, delete "resealing" and insert -- rescaling --, therefor.

Signed and Sealed this
Twenty-seventh Day of October, 2015

Michelle K. Lee
*Director of the United States Patent and Trademark Office*